United States Patent [19]

Dutcher

[11] 4,261,483
[45] Apr. 14, 1981

[54] CONTAINER WITH SPOUT AND BLANK FOR MAKING SAME

[75] Inventor: Daniel Dutcher, Woodbury, Minn.

[73] Assignee: Champion International Corporation, Stamford, Conn.

[21] Appl. No.: 921,569

[22] Filed: Jul. 3, 1978

[51] Int. Cl.³ .............................................. G01F 11/10
[52] U.S. Cl. ..................................... 222/364; 222/456
[58] Field of Search ............... 222/364, 454, 455, 456, 222/457, 457.5, 535; 229/17 M

[56] References Cited

U.S. PATENT DOCUMENTS

| | | | |
|---|---|---|---|
| 2,069,281 | 2/1937 | Sebreny | 222/364 X |
| 2,610,770 | 9/1952 | Penfield | 229/17 M X |
| 2,898,004 | 8/1959 | Klausmann | 222/364 X |
| 2,943,769 | 7/1960 | Klausmann | 222/364 |
| 3,057,524 | 10/1962 | Shanks | 222/454 X |
| 3,187,961 | 6/1965 | Moore | 222/364 X |
| 3,831,833 | 8/1974 | Dressler et al. | 229/17 M |
| 3,921,862 | 11/1975 | Holmstrom | 222/364 X |
| 4,111,351 | 9/1978 | Mackierman | 222/364 X |

*Primary Examiner*—Stanley H. Tollberg
*Assistant Examiner*—Fred A. Silverberg
*Attorney, Agent, or Firm*—Evelyn M. Sommer

[57] ABSTRACT

A carton for dispensing a metered amount of the contents thereof comprising a spout formed in a wall of the carton, the spout comprising a front wall, a back wall, and side walls forming a spout container whereby a predetermined volume of the carton content may be contained therein and with the spout container attached at the base thereof to an opening in said carton wall in a pivotal relationship whereby the spout container volume is located within the carton to be filled with a predetermined amount of carbon product and then pivoted outwardly about the base thereof to locate such spout container volume outside the carton to enable dispensing of only the predetermined volume of carton contents contained therein.

8 Claims, 8 Drawing Figures

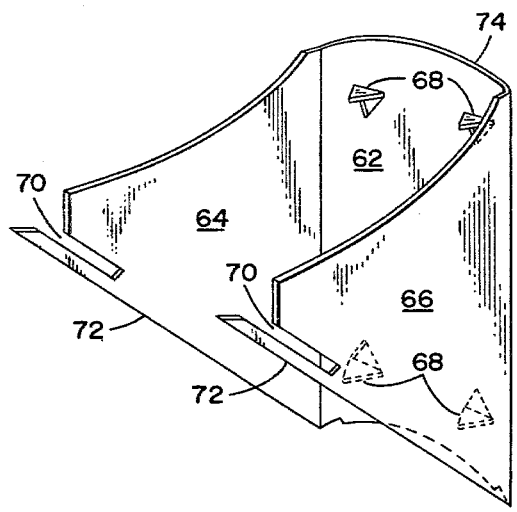
FIG 3
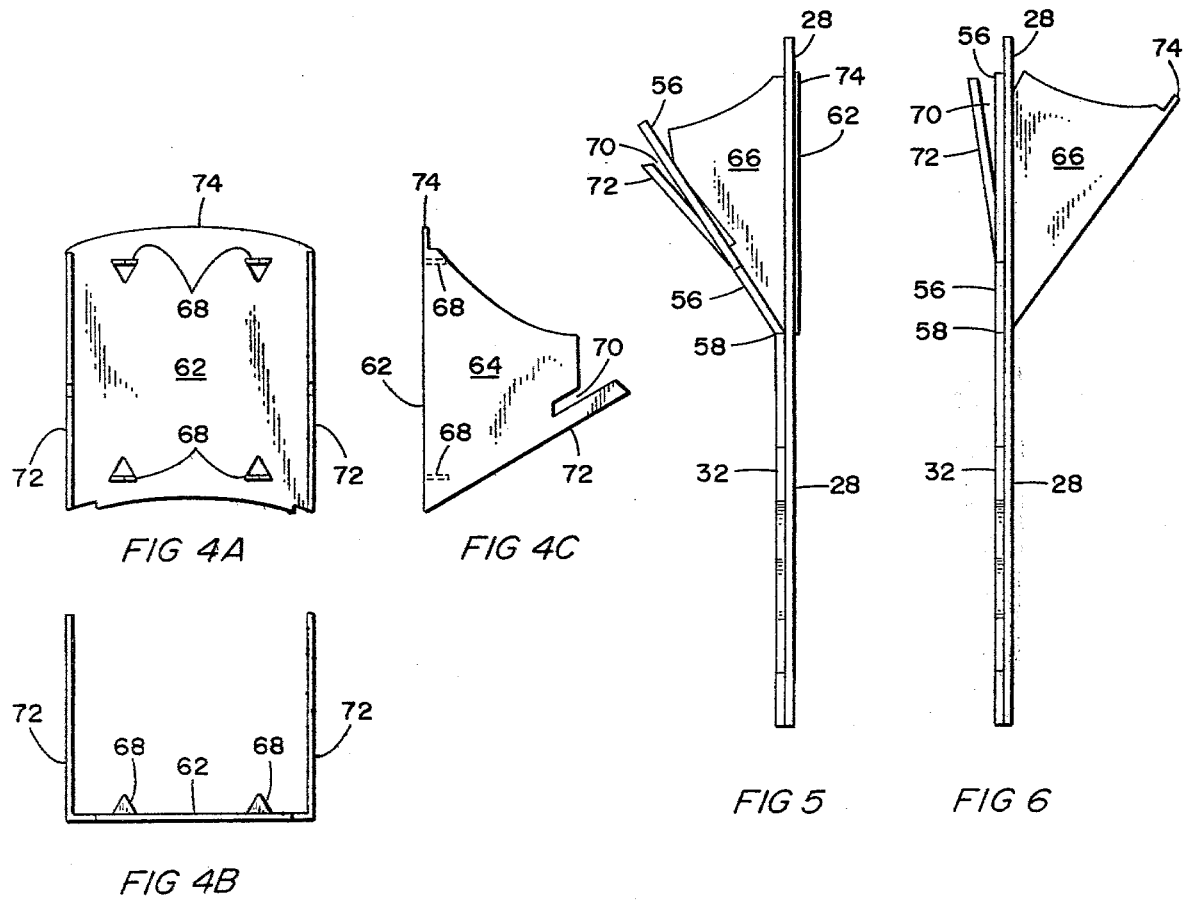
FIG 4A
FIG 4B
FIG 4C
FIG 5
FIG 6

CONTAINER WITH SPOUT AND BLANK FOR MAKING SAME

BACKGROUND OF THE INVENTION

This invention relates to cartons for containing a product to be dispensed therefrom and in particular, to cartons having a pouring spout container mounted therein for dispensing only a predetermined amount of said carton product each time said spout is opened.

A great many products packaged for consumer use today are those type of products which need to be used in specific amounts. Among such products are detergents, dish washing soap, sugar, salt, and the like. Such products are usually packaged in a carton having a spout therein so that the consumer can pour the product from the carton through the spout into a measuring device of some type in order to obtain the required amount of the product to be used at a particular time. The use of many of these products requires a guess on the part of the consumer as to the amount of the packaged material being dispensed. Thus, the cartons as used in the present state of the art for the purposes as set forth above are not only an inconvenience for the consumer who must either try to locate a measuring object of some type to determine the quantity of material being dispensed from the carton or the consumer must guess as to the amount being used, and thus, either dispenses too much of the product or obtains too little of the product, thereby resulting in an inefficient or improper use of the product.

SUMMARY OF THE INVENTION

The present invention relates to cartons having a pouring spout container formed in a wall thereof whereby said spout can provide a predetermined volume of the carton contents each time the contents are dispensed therefrom.

Specifically, the invention relates to a carton for dispensing a metered amount of the contents thereof comprising a spout formed in a wall of said carton, said spout comprising a front wall, a back wall and side walls forming a spout container whereby a predetermined volume of the carton contents may be contained therein, and means attaching said spout container in a pivotal relationship at the base thereof to an opening in said carton wall whereby said spout container volume is located within said carton to be filled with a predetermined amount of carton product and then pivoted outwardly about the base thereof through said opening to locate said spout container volume outside said carton to enable dispensing of the predetermined volume of carton contents contained therein. The invention also relates to a blank for use in forming said carton.

BRIEF DESCRIPTION OF THE DRAWINGS

These and other objects and advantages of the present invention will become apparent on reading the following detailed description of the preferred and alternate embodiments thereof in relation to the accompanying drawings in which:

FIG. 3 is an isometric view of a metallic spout closure which may be attached to the carton wall shown in FIG. 2 to form a carton spout container as shown in FIG. 2;

FIG. 4A, FIG. 4B and FIG. 4C are front, side, and top views respectively, of the metallic spout closure;

FIG. 5 is a side view of the carton wall of FIG. 2 with the spout closure of FIG. 3 installed and shown in the closed condition wherein the spout container volume would be located wholly inside the carton; and FIG. 6 is a side view of the carton wall shown in FIG. 2 wherein the spout closure of FIG. 3 has been installed therein and is shown with the spout container volume totally on the outside of said carton whereby the contents thereof may be dispensed.

BRIEF DESCRIPTION OF THE PREFERRED EMBODIMENT

Figure 1:
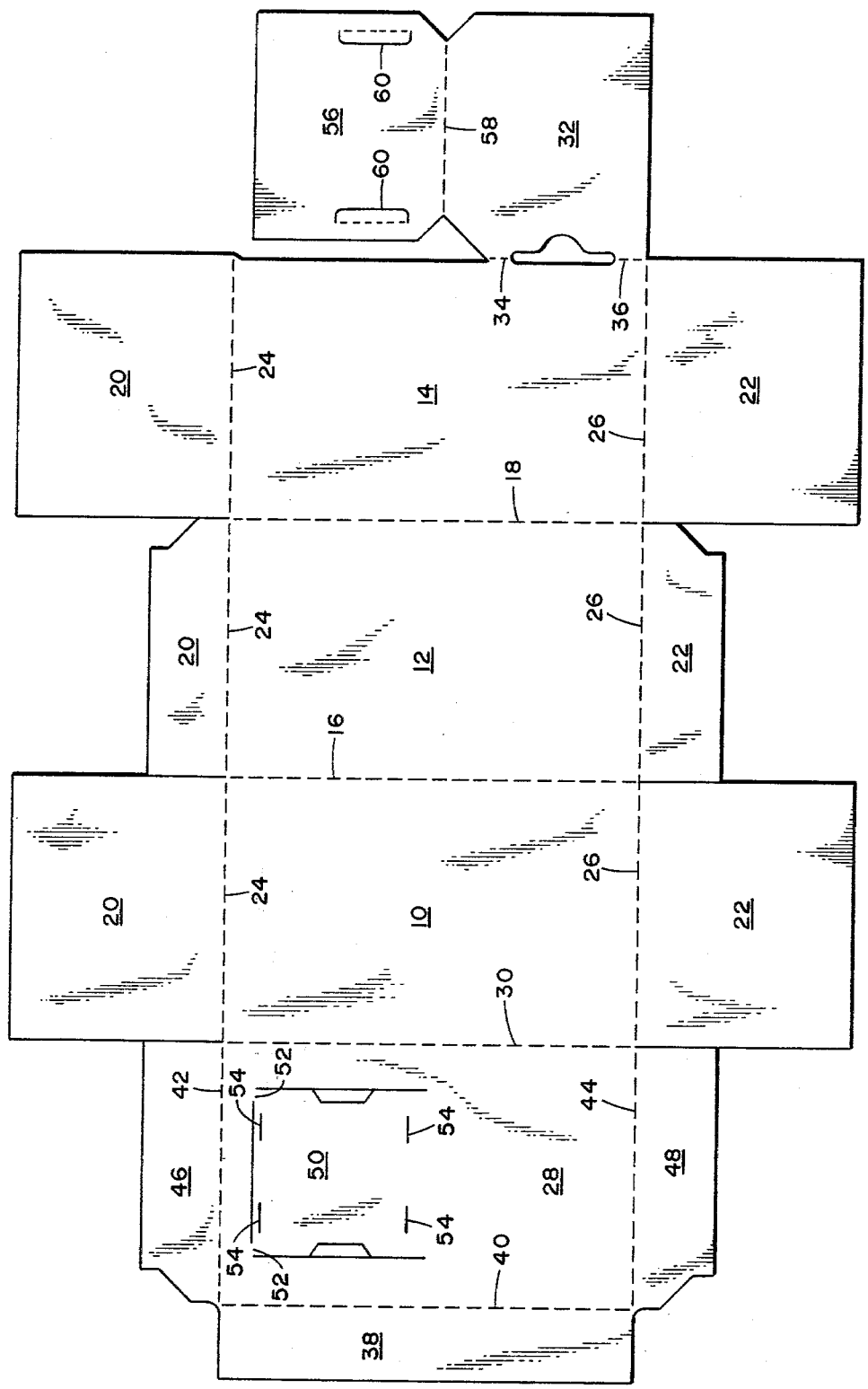
FIG. 1 is a plan view of the novel blank used for forming said carton.

Referring to the drawings, FIG. 1 is a plan view of a blank from which the novel carton having a pouring spout container therein is formed. The object of forming the blank disclosed in FIG. 1 is to produce the desired carton body from a unitary blank of any conventional paper sheet stock for ease of construction. The blank of FIG. 1 comprises first, second, and third side wall panels 10, 12, and 14, respectively, hingedly attached to each other in contiguous relationship along hinge lines 16 and 18, respectively. Top and bottom closure panels 20 and 22, respectively, are hingedly attached at 24 and 26, respectively, to each of said side wall panels 10, 12, and 14. An outer wall panel 28 is hingedly attached to said first side wall panel 10 at hinge line 30. Inner wall panel 32 is hingedly attached to said third side wall panel 14 along portions 34 and 36 of the lower half only. When said carton is tubed and folded, and wall panel 32 lies under and is attached to the lower half of the outer wall panel 28. Attached to the outer edge of outer panel 28 along hinge line 40 is glue panel 38. Also attached to the top and bottom of outer panel 28 at hinge lines 42 and 44 are closure panels 46 and 48. Any adhesive conventionally used for the purpose can be used for attachment of the panels.

Integrally formed in outer panel 28 is first flap 50 which, when the carton is folded and tubed, becomes the lip of the pouring spout container. Flap 50 is integrally formed in outer panel 28 by slits 51, 53 and 55 on three sides thereof leaving the base thereof attached to said outer panel 28. Although no score line is shown in FIG. 1 at the base of first flap 50 it is within the scope of the present invention to place a score line there if desired. Without a score line, the flap 50 tends to stay in the plane of the blank even when pivoted outwardly as a spout. First flap 50 is held in place in outer panel 28 by nicks 52 which, of course, are easily severed or torn when it is desired to remove the top edge 53 of first flap 50 from outer panel 28. First flap 50 then bends about its base to allow movement out of the plane of the carton blank. Also formed in first flap 50 are a plurality of slits 54 which receive projections for attaching a spout closure thereto and forming a lip or front wall of a pouring spout when said carton blank is folded and tubed. Second flap 56 is integrally formed with and hingedly attached at articulation 58 to inner wall panel 32. Second flap 56 has a generally vertically extending slit 60 on either side thereof for receiving projections which attach a spout closure thereto when said carton is folded and tubed thereby forming a back wall of a pouring spout container.

Figure 2:
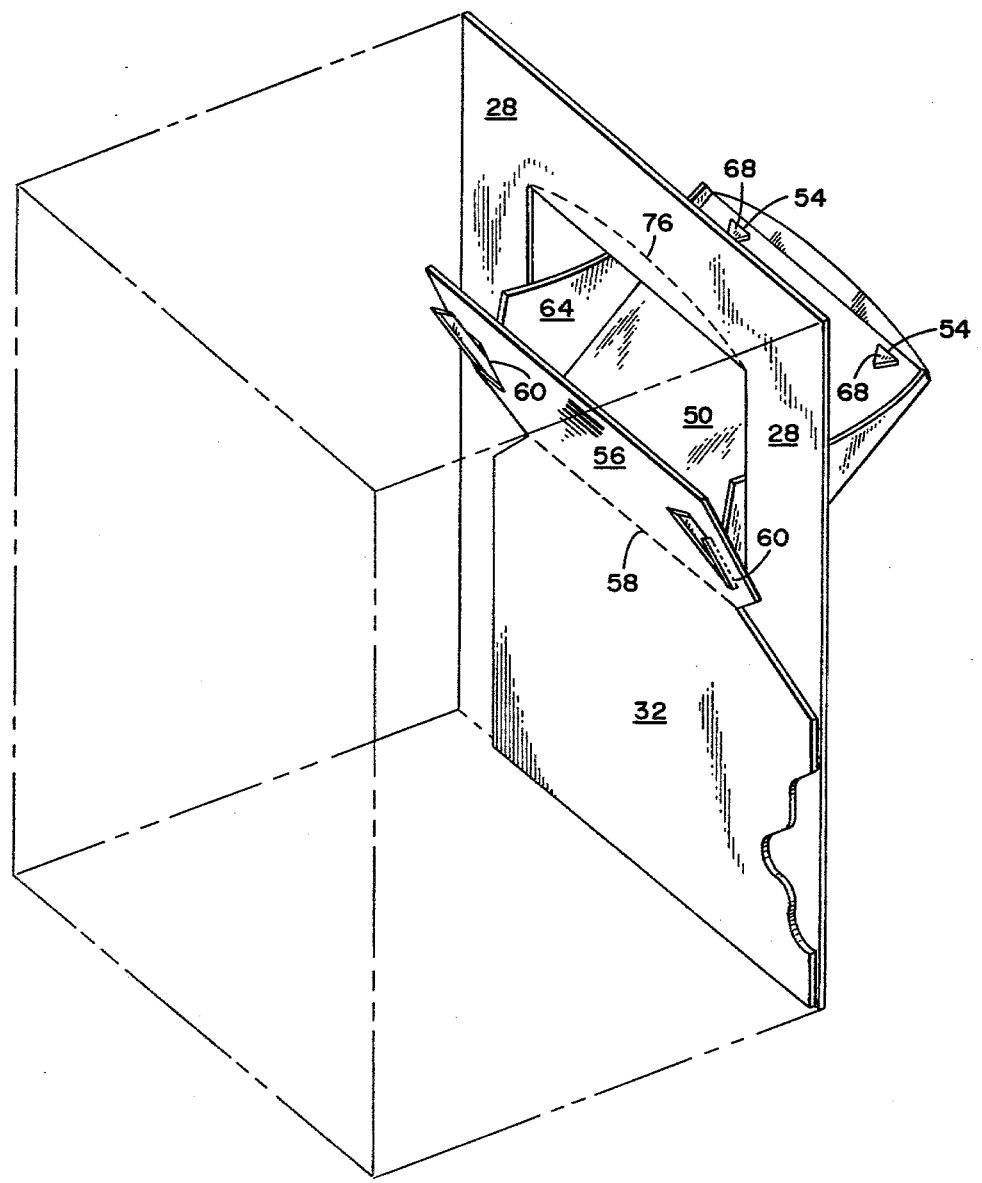
FIG. 2 is a phantom isometric view of the tubed and folded carton illustrating in detail the carton wall having the pouring spout container formed therein.

FIG. 2 is a phantom isometric view of the novel carton having a pouring spout container in a wall thereof and which details the carton wall in which the pouring spout is located. As can be seen in FIG. 2, inner wall panel 32 is attached to outer wall panel 28 by glue or other well known means. Since it is desired to form a pouring spout container which holds a predetermined amount of the product contained in the carton, second flap 56 hingedly attached at the hinge line 58 to the top of inner panel 32 forms a back wall of the novel pouring spout container. First flap 50 which is movably attached at the base thereof to outer panel 28, forms the lip of the pouring spout container. In order to maintain first flap 50 and second flap 56 in a predetermined relationship with respect to each other as shown and at the same time to provide a pair of side walls for the pouring spout container, a spout closure as shown in FIG. 3 is attached to both first flap 50 and second flap 56 as shown in FIG. 2 and FIGS. 5 and 6.

FIG. 3 is an isometric view of the spout closure utilized to hold first and second flaps 50 and 56, respectively in a spaced apart relationship thereby forming a spout lip, side walls and spout back wall, respectively. The spout closure, in the preferred embodiment, is made of a metal such as aluminum. However, it could also be made of plastic or other rigid material which will maintain its shape and its attachment to first and second flaps 50 and 56. As shown in FIG. 3, the spout closure comprises a rectangular center portion 62 and side wings 64 and 66. Side wings 64 and 66 are generally triangular in shape and are appendages which extend from and are perpendicular to each side of rectangular center portion 62, thus forming the side walls of said pouring spout container. A plurality of projections 68 are formed in rectangular center piece 62 as shown in FIGS. 4A, 4B and 4C for attaching said first flap 50 shown in FIG. 2 to the inside of rectangular portion 62 to form the lip of said pouring spout container. As can be seen in FIG. 2, once the projections 68 have been inserted through slits 54, they can be bent over to engage and maintain first flap 50 in fixed relationship thereto. Also shown in FIG. 3 is a slot 70 formed at the rear of and along one edge 72 of each of said side wings 64 and 66 which extends to the outer end thereof. These slots cooperate with vertical slits 60 in second flap 56 as shown in FIG. 1 and FIG. 2 to attach second flap 56 to one edge 72 of each of said side wings 64 and 66 to hold second flap 56 in a rigid position as the back wall of said pouring spout container with respect to spout lip 50. Thus, a spout container is formed having a back wall 56, a front wall 50 which also serves as the spout lip, and side walls 64 and 66. Thus, the spout container formed holds a predetermined volume of the carton contents but also serves as the pouring spout of the carton. As can be seen in FIG. 2 and in FIG. 3, the upper curved portion 74 of rectangular center portion 62 of the spout closure is integrally formed with and projects above the top 53 of first flap 50 whereby a spout stop is formed which contacts the outer wall 28 to prevent the spout closure 62 from being wholly contained in the carton. Dashed line 76 in FIG. 2 located immediately above the opening formed by first flap 50 in outer panel 28 represents the location of the stop 74 when the spout is in its closed position. Thus, stop 74 is integrally formed with and projects above the rectangular center portion of the spout closure 62 whereby stop 74 contacts outer wall 28 of the carton to prevent the spout closure 62 from being wholly contained in said carton.

FIG. 5 is a side view of the carton wall in which the pouring spout container is located and illustrates the pouring spout container in its closed position with the container itself being wholly positioned inside the carton. Thus, outer panel 28 and inner panel 32 are joined together in a fixed relationship by means such as glue or the like. Although the rectangular center portion of the spout closure 62 rests against the outside of outer panel 28 with lip 74 resting against outer panel 28 thus effectively preventing any of the carton contents from escaping or being dispensed, the container itself formed by side wings 64 and 66, the back wall formed by second flap 56 and the front wall formed by first flap 50 attached to the inside of the rectangular center portion of the spout closure 62 is located wholly within the carton. As can be seen in FIG. 5, the back wall or second flap 56 is caught in slot 70 of the spout closure to hold it in fixed relationship with respect to the front wall or rectangular center panel 62 of the spout closure. The side wings 64 and 66 are effective side walls for completely enclosing and forming the pouring spout container. In this position, the carton can be turned upside down and then right side up to fill the container with the carton contents.

FIG. 6 illustrates the pouring spout container when the container itself is located wholly outside the carton in a position to dispense the products contained therein by the filling process previously described. In this position, back wall or second flap 56 is located against outer panel 28, thus closing the carton effectively to prevent any of the contents from being dispensed from the inside while the contents of the pouring spout container is being discharged.

This can be seen clearly in FIG. 6 which shows the inside of wall 28 when the spout is in its external position ready to dispense the contents contained therein. In this position the back wall or second flap 56 is shown flush against outer panel 28 and, since it is larger than first flap 50, is seen totally covering the opening in outer panel 28 left by first flap 50 which has been attached to spout closure 78 by means of projection 68. Thus, it can be seen in this position that the carton opening is closed and none of the contents of the package will be dispensed through the opening formed by movement of first flap 50 when the spout is in its open position and the carton tipped or tilted wherein the contents it contains can be dispensed.

While the invention has been described in connection with a preferred embodiment, it is not intended to limit the scope of the invention to the particular form set forth, but on the contrary it is intended to cover such alternatives, modifications and equivalents as may be included within the spirit and scope of the invention as defined by the appended claims.

What is claimed is:

1. In a carton made from sheet stock having a composite pouring spout which include non-integral side walls in a wall thereof, the wall and the pouring spout comprising:
   (a) the wall being formed of inner and outer panels fixed in superimposed relationship,
   (b) a first flap integrally formed in said outer wall panel and attached at the base thereof to said outer wall panel,
   (c) a second flap larger than said first flap integrally formed with and attached at the base thereof to said inner wall panel, and (d) said side walls being attached to said first and said second flaps and holding said flaps in spaced apart relationship to define the composite pouring spout having a predetermined volume in said wall, said spout being pivotable about its base from a first position inside said carton for filling said spout to a second position outside said carton for both closing said carton by means of said second flap and dispensing said spout contents.

2. A carton made from sheet stock having a composite pouring spout which includes non-integral side walls for dispensing a metered amount of the contents thereof comprising:
   (a) said spout being formed in a wall of said carton,
   (b) said spout comprising a front wall, a larger back wall, and said side walls whereby a predetermined volume of the carton contents may be contained therein, and
   (c) means attaching said spout in a
   pivotal relationship at the base thereof to an opening in said carton wall, said attaching means comprising said front and said back spout walls each being integrally formed with and pivotally connected at the base thereof to said carton wall whereby said spout volume is located within said carton to be filled with a predetermined amount of carton product and then pivoted outwardly about the base thereof through said opening to locate said spout volume outside said carton to enable dispensing of the predetermined volume of carton contents contained therein,
   (d) the wall of the carton being formed of inner and outer panels in fixed superimposed relationship.

3. A carton as in claim 2, wherein said spout container front wall is integrally formed with and pivotally attached at the base thereof to said outer panel for forming both an opening in said outer panel and a front wall of said spout and said spout container back wall is integrally formed with and pivotally attached by a hinge line at the base thereof to said inner panel for forming both a closure for said outer panel opening and the back wall of said spout container, said back wall having a generally extending vertical slit on either side thereof.

4. A carton as in claim 3, further including:
   (a) a said spout comprising:
      (i) a rectangular center portion,
      (ii) said side walls comprising generally triangular side wings extending from and perpendicular to each side of said rectangular center portion,
      (iii) a plurality of projections formed in said rectangular center piece for attaching said spout front wall to the inside of said rectangular portion to form the lip of said spout,
      (iv) a slot formed along one edge of each of said side wings and extending to the outer end thereof for cooperating with said vertical slit in said back wall to attach said back wall to one edge of each of said side wings to hold said back wall in a rigid position with respect to said front wall whereby said spout is formed with said back wall, said front wall which serves as the spout lip, and said side walls which hold a predetermined volume of the carton contents.

5. A carton as in claim 4, further including:
   (a) a lip integrally formed with and projecting above said rectangular portion of said spout whereby said lip contacts said outer wall to prevent said spout from being wholly contained in said carton.

6. A carton made from sheet stock having a composite pouring spout which includes non-integral side walls for dispensing a metered amount of the contents thereof comprising:
   (a) said spout being formed in a wall of said carton,
   (b) inner and outer panels fixed in superimposed relationship forming the carton wall in which said spout is located,
   (c) a first flap integrally formed with and pivotally attached at the base thereof to said outer panel for forming both an opening in said outer panel and the front wall of said spout,
   (d) a second flap integrally formed with and pivotally attached at the base thereof by a hinge line to said inner panel for forming both a closure for said outer panel opening and the back wall of said spout,
      (i) said second flap being larger than said first flap so as to completely cover the opening in said outer panel when said spout is moved from a first position inside said carton to a second outermost position outside said carton,
      (ii) said second flap having a generally extending vertical slit on either side thereof,
   (e) means attached to said first and second flaps to form said side walls whereby a spout with a predetermined volume is formed,
   (f) said spout being pivotable about the base of said first and second flaps between open and closed positions whereby,
      (i) in a closed position said front wall closes said carton opening and the spout volume is wholly within said carton for receiving a predetermined amount of the carton contents and
      (ii) in an open position said back wall closes said carton opening and the spout volume is wholly without said carton for dispensing said predetermined amount of carton content, and
   (g) means attached to said front wall at the upper edge thereof to prevent said front wall and thus the spout from being wholly contained inside said carton.

7. A carton for dispensing a metered amount of the contents thereof comprising:
   (a) a spout formed in a wall of said carton,
   (b) inner and outer panels forming the carton wall in which said spout is located,
   (c) a first flap integrally formed with and pivotally attached at the base thereof to said outer panel for forming both an opening in said outer panel and the front wall of said spout,
   (d) a second flap integrally formed with and pivotally attached at the base thereof by a hinge line to said inner panel for forming both a closure for said outer panel opening and the back wall of said spout,
      (i) said second flap being larger than said first flap so as to completely cover the opening in said outer panel when said spout is removed from a first position inside said carton to a second outermost position outside said carton,
      (ii) said second flap having a generally extending vertical slit on either side thereof,
   (e) a spout closure comprising:
      (i) a rectangular center portion,
      (ii) a generally triangular side wing extending from and perpendicular to each side of said rectangular center portion for forming the side walls of said spout, (iii) a plurality of projections formed in said rectangular center portion for attaching said front wall to the inside of said rectangular center portion to secure said front wall thereto, (iv) a slot formed along one edge of each of said side wings and extending to the outer end thereof for cooperating with said vertical slits in said second flap to attach said second flap to one edge of each of said side wings to secure said second flap in a rigid position as the back wall of said spout with respect to said front wall whereby a spout container is formed with said back wall, said front wall which serves as the spout lip and said side walls which hold a predetermined volume of the carton contents, and (f) a spout stop integrally formed with and projecting above said rectangular portion of said spout closure whereby said stop contacts said outer wall to prevent said spout from being wholly contained in said carton.

8. A blank for a carton having a pouring spout container which dispenses a metered amount of the product contained therein, said blank comprising:

(a) first, second and third side wall panels hingedly attached in contiguous relationship, (b) top and bottom closure panels hingedly attached to each of said side wall panels, (c) an outer wall panel hingedly attached to the remaining edge of said first side wall panel, (d) a first flap integrally formed in said outer panel and pivotally attached at the base thereof to said outer wall panel and having formed therein slits for receiving projections which attach a spout closure thereto, said first flap forming the front wall of said pouring spout container, (e) an inner wall panel hingedly attached to the remaining edge of said third side wall panel along portions of the lower half only for lying under and being attached to said outer wall panel when said blank is folded to form a carton, (f) a second flap integrally formed with and hingedly attached to said inner wall panel, said flap being pivotally attached at the base thereof to said inner wall panel and having a generally vertically extending slit on either side thereof for receiving projections which attach said spout closure thereto when said carton is folded to form side wings holding said first and second flaps apart in fixed relationship thereby forming a back wall, front wall and side walls of said pouring spout container, (g) a glue flap hingedly attached to the outer edge of said outer panel and (h) top and bottom closure panels hingedly attached to said outer panel for totally enclosing the carton formed when said blank is folded and tubed.

* * * * *